US010198697B2

(12) United States Patent
Christian et al.

(10) Patent No.: US 10,198,697 B2
(45) Date of Patent: *Feb. 5, 2019

(54) EMPLOYING USER INPUT TO FACILITATE INFERENTIAL SOUND RECOGNITION BASED ON PATTERNS OF SOUND PRIMITIVES

(71) Applicant: OtoSense Inc., Cambridge, MA (US)

(72) Inventors: Sebastien J. V. Christian, Mountain View, CA (US); Thor C. Whalen, Menlo Park, CA (US)

(73) Assignee: OtoSense Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,236

(22) Filed: Sep. 2, 2016

(65) Prior Publication Data

US 2016/0379666 A1    Dec. 29, 2016

Related U.S. Application Data

(63) Continuation-in-part of application No. 15/209,251, filed on Jul. 13, 2016, now Pat. No. 9,749,762, which
(Continued)

(51) Int. Cl.
*G10L 25/48*     (2013.01)
*G06N 99/00*    (2010.01)
(Continued)

(52) U.S. Cl.
CPC ....... *G06N 99/005* (2013.01); *G08B 13/1672* (2013.01); *G08B 21/182* (2013.01);
(Continued)

(58) Field of Classification Search
CPC ... G10L 2015/088; G10L 15/26; G10L 15/08; G06F 17/30787; G06F 17/30038; G06F 17/30702; G06F 3/167
See application file for complete search history.

(56) References Cited

U.S. PATENT DOCUMENTS 5,918,223 A     6/1999   Blum
7,962,330 B2 *  6/2011   Goronzy ............... G10L 25/00
                                             700/94
(Continued)

OTHER PUBLICATIONS

Rui Cai et al., "A Flexible Framework for Key Audio Effects Detection and Auditory Context Inference", May 2006, IEEE Transactions on Audio, Speech, and Language Processing, pp. 1026-1039.*
(Continued)

*Primary Examiner* — Douglas Godbold
*Assistant Examiner* — Mark Villena
(74) *Attorney, Agent, or Firm* — Park, Vaughan, Fleming & Dowler LLP

(57) ABSTRACT

The disclosed embodiments provide a system that generates sound primitives to facilitate sound recognition. First, the system performs a feature-detection operation on sound samples to detect a set of sound features, wherein each sound feature comprises a measurable characteristic of a window of consecutive sound samples. Next, the system creates feature vectors from coefficients generated by the feature-detection operation, wherein each feature vector comprises a set of coefficients for sound features detected in a window. The system then performs a clustering operation on the feature vectors to produce feature-vector clusters, wherein each feature-vector cluster comprises a set of feature vectors that are proximate to each other in a feature-vector space that contains the feature vectors. After the clustering operation, the system defines a set of sound primitives, wherein each sound primitive is associated with a feature-vector cluster. Finally, the system associates semantic labels with the set of sound primitives.

31 Claims, 14 Drawing Sheets
(4 of 14 Drawing Sheet(s) Filed in Color)

Related U.S. Application Data is a continuation-in-part of application No. 14/616,627, filed on Feb. 6, 2015, now Pat. No. 9,812,152.

(60) Provisional application No. 62/387,126, filed on Dec. 23, 2015, provisional application No. 61/936,706, filed on Feb. 6, 2014.

(51) Int. Cl.
*G10L 21/10* (2013.01)
*G10L 25/27* (2013.01)
*G10L 21/14* (2013.01)
*G08B 13/16* (2006.01)
*G08B 21/18* (2006.01)

(52) U.S. Cl.
CPC ............ *G10L 21/10* (2013.01); *G10L 21/14* (2013.01); *G10L 25/27* (2013.01); *G10H 2210/031* (2013.01); *G10H 2220/131* (2013.01); *G10H 2240/075* (2013.01)

(56) References Cited

U.S. PATENT DOCUMENTS

| | | | |
|---|---|---|---|
| 7,991,206 B1 | 8/2011 | Kaminski, Jr. | |
| 8,082,279 B2 | 12/2011 | Weare | |
| 8,463,000 B1 | 6/2013 | Kaminski, Jr. | |
| 8,682,654 B2* | 3/2014 | Chen | G10L 25/00 704/213 |
| 8,706,276 B2 | 4/2014 | Ellis | |
| 8,838,260 B2 | 9/2014 | Pachet | |
| 9,009,054 B2* | 4/2015 | Liu | G06F 17/30749 704/208 |
| 9,215,539 B2 | 12/2015 | Kim | |
| 2002/0023020 A1 | 2/2002 | Kenyon | |
| 2002/0037083 A1 | 3/2002 | Weare | |
| 2002/0164070 A1 | 11/2002 | Kuhner et al. | |
| 2003/0045954 A1 | 3/2003 | Weare | |
| 2003/0086341 A1 | 5/2003 | Wells | |
| 2005/0091275 A1 | 4/2005 | Burges | |
| 2005/0160449 A1* | 7/2005 | Goronzy | G10L 15/00 725/5 |
| 2007/0276733 A1 | 11/2007 | Geshwind | |
| 2008/0001780 A1 | 1/2008 | Ohno | |
| 2008/0193016 A1* | 8/2008 | Lim | G06F 17/30787 382/190 |
| 2010/0114576 A1 | 5/2010 | Sundararajan | |
| 2010/0271905 A1 | 10/2010 | Khan et al. | |
| 2011/0106531 A1* | 5/2011 | Liu | G06F 17/30743 704/214 |
| 2012/0066242 A1 | 3/2012 | Sathya | |
| 2012/0143610 A1 | 6/2012 | Wang et al. | |
| 2012/0224706 A1 | 9/2012 | Hwang et al. | |
| 2012/0232683 A1 | 9/2012 | Master | |
| 2013/0345843 A1 | 12/2013 | Young | |
| 2014/0056432 A1* | 2/2014 | Loui | G10L 25/51 381/56 |
| 2014/0096058 A1* | 4/2014 | Molesky | G06F 17/211 715/771 |
| 2016/0022086 A1 | 1/2016 | Yuan | |

OTHER PUBLICATIONS

Chang et al.; "LIBSVM: A Library for Support Vector Machines", created in 2001, Last updated: Mar. 4, 2013, maintained at http://www.csie.ntu.tw/~cjlin/papers/libsvm.pdf.

Shazam; http://www.shazam.com/apps; accessed Apr. 5, 2017.

International Search Report and Written Opinion for Application No. PCT/US2015/014927, May 18, 2015.

* cited by examiner

EMPLOYING USER INPUT TO FACILITATE INFERENTIAL SOUND RECOGNITION BASED ON PATTERNS OF SOUND PRIMITIVES

CROSS-REFERENCE TO RELATED APPLICATIONS

This application is a continuation-in-part of, and hereby claims priority under 35 U.S.C. § 120 to, pending U.S. patent application Ser. No. 15/209,251, entitled "Facilitating Inferential Sound Recognition based on Patterns of Sound Primitives," by inventors Sebastien J. V. Christian and Thor Whalen, filed 13 Jul. 2016. U.S. patent application Ser. No. 15/209,251 is itself a continuation-in-part of, and hereby claims priority under 35 U.S.C. § 120 to, pending U.S. patent application Ser. No. 14/616,627, entitled "Systems and Methods for Identifying a Sound Event," by inventor Sebastien J. V. Christian, filed 6 Feb. 2015. U.S. patent application Ser. No. 14/616,627 itself claims priority under 35 U.S.C. § 119 to U.S. Provisional Application No. 61/936, 706, entitled "Sound Source Identification System," by inventor Sebastien J. V. Christian, filed 6 Feb. 2014. The instant application also claims priority under 35 U.S.C. § 119 to U.S. Provisional Application No. 62/387,126, entitled "Systems and Methods for Identifying a Sound Event Using Perceived Patterns," by inventor Sebastien J. V. Christian, filed 23 Dec. 2015. The above-listed applications are all hereby incorporated herein by reference.

BACKGROUND

Field

The disclosed embodiments generally relate to the design of automated systems for recognizing sounds. More specifically, the disclosed embodiments relate to the design of an automated system that uses human input to facilitate an inferential technique that recognizes non-speech sounds based on patterns of sound primitives.

Related Art

Recent advances in computing technology have made it possible for computer systems to automatically recognize sounds, such as the sound of a gunshot, or the sound of a baby crying. This has led to the development of automated systems for detecting corresponding events, such as gunshot-detection systems and baby-monitoring systems. However, these existing systems are presently unable to detect higher-level events that are associated with collections of related sounds. For example, the sound of a baby crying followed by the sound of a human voice and then silence might indicate that a person has taken care of a crying baby. Detecting such higher-level events is a complicated task because the related sounds might occur in different sequences or at the same time.

Hence, what is needed is a system for detecting higher-level events that are associated with patterns of related sounds.

SUMMARY

The disclosed embodiments provide a system that generates sound primitives to facilitate inferential sound recognition. During operation, the system performs a feature-detection operation on a set of sound samples to detect a set of sound features, wherein each sound feature comprises a measurable characteristic of a window of consecutive sound samples, and wherein detecting the sound feature involves generating a coefficient indicating a likelihood that the sound feature is present in the window. Next, the system creates a set of feature vectors from coefficients generated by the feature-detection operation, wherein each feature vector is associated with a window of consecutive sound samples and comprises a set of coefficients for sound features detected in the window. The system then performs a clustering operation on the set of feature vectors to produce a set of feature-vector clusters, wherein each feature-vector cluster comprises a set of feature vectors that are proximate to each other in a feature-vector space that contains the set of feature vectors. After the clustering operation, the system defines a set of sound primitives, wherein each sound primitive is associated with a feature-vector cluster in the set of feature-vector clusters. Finally, the system associates semantic labels with sound primitives, wherein a semantic label for a sound primitive comprises one or more words that describe a sound characterized by the sound primitive.

In some embodiments, the system performs a sound-recognition operation that recognizes one or more sounds in an audio stream based on combinations of sound primitives detected in the audio stream.

In some embodiments, performing the sound-recognition operation comprises: recognizing a sequence of sound primitives in the audio stream; feeding the sequence of sound primitives into an infinite-state automaton that recognizes events associated with sequences of sound primitives; and feeding the recognized events into an output system that generates an output associated with the recognized events to be displayed to a user.

In some embodiments, while associating a semantic label with a sound primitive, the system performs the following operations. If semantic labels already exist for feature vectors in a feature-vector cluster for the sound primitive, the system examines the semantic labels to determine a dominant semantic label for the feature-vector cluster. If semantic labels do not exist for the feature vectors in the feature-vector cluster, the system queries one or more users to obtain semantic labels for windows of consecutive sound samples associated with feature vectors in the feature-vector cluster to determine the dominant semantic label for the feature-vector cluster. Next, the system associates the dominant semantic label with the sound primitive.

In some embodiments, a sound feature includes one or more of the following: (1) an average value for a parameter of a sound signal over a window of consecutive sound samples; (2) a spectral-content-related parameter for a sound signal over the window of consecutive time samples; and (3) a shape-related metric for a sound signal over the window of consecutive sound samples.

In some embodiments, the system displays a sound network to a user through a sound-network user interface (UI), wherein the sound-network UI represents the feature-vector space that contains the set of feature vectors. (Note that this sound-network UI is also referred to as "SPlatter," wherein the term "SPlatter" refers to a "sound platter.") Within the sound-network UI, nodes represent feature vectors in the feature-vector space, and edges between nodes in the sound-network UI are associated with distances between associated feature vectors in the feature-vector space. The sound-network UI enables the user to tag each node with a semantic label, thereby associating a corresponding window of consecutive sound samples with the semantic label. The sound-network UI also enables the user to move nodes closer together or farther apart in the sound-network UI, which causes the feature-vector space to warp so that associated feature vectors are correspondingly closer together or farther apart in the feature-vector space.

Because the sound-network UI (Splatter) displays multi-dimensional points using only two dimensions, we need to mitigate the distortion inherent in such a lower-dimensional mapping. In order to do so, we can use force-directed graphs that are specified by a choice of pairs of sounds whose similarities need to be resolved. A force-directed graph will converge to a layout of the sounds that maximizes these similarity resolutions. Another problem arises in this approach; we cannot specify the similarity of all pairs of sounds we are displaying because this will lead to an unreasonable use of computation resources (for example, 1000 sounds will require analyzing nearly half a million pairs). In order to solve this problem, we can use a technique based on a heuristic that maximizes the information-gain to number-of-pairs ratio. The "link chooser" component that embodies this technique is designed to sacrifice the granular precision of the similarities to get better global results—that is, bringing similar sounds closer to each other and dissimilar sound further apart without necessarily being able to get an accurate sense of how close or how far.

In some embodiments, when a node is moved in the sound-network UI, edges connecting the node with other nodes in the sound-network UI expand or contract, which changes corresponding attractive or repulsive forces exerted by the edges, thereby causing a set of directly or indirectly connected nodes in the sound-network UI to move accordingly.

In some embodiments, each edge in the sound network has a default length, wherein compressing or stretching the edge away from the default length creates an opposing force that seeks to restore the edge to the default length.

In some embodiments, displaying the sound network comprises: (1) displaying a set of nodes associated with a selected subset of the set of feature vectors; and (2) displaying a selected subset of edges between the set of nodes.

In some embodiments, when a user activates a node in the sound-network UI, a window of consecutive sound samples associated with the node is played for the user.

In some embodiments, the sound-network UI enables a user to define supplemental edges between nodes displayed in the sound-network UI.

In some embodiments, causing the feature-vector space to warp in response to the user moving nodes closer together or farther apart in the sound-network UI involves changing weights associated with features in the feature-vector space.

In some embodiments, each semantic label is associated with a self-similarity value, which indicates a level of self-similarity among nodes that share the semantic label, wherein nodes that share a semantic label with a higher level of self-similarity tend to be closer together in the sound-network UI than nodes that share a semantic label with a lower level of self-similarity.

In some embodiments, the system also displays a semantic network to the user through a semantic-network UI, wherein each node in the semantic-network UI represents a feature-vector cluster in the feature-vector space, and is tagged with a semantic label for the feature-vector cluster. The semantic-network UI enables the user to move nodes closer together or farther apart in the semantic-network UI, which causes the feature-vector space to warp so that the associated feature-vector-cluster centers are correspondingly closer together or farther apart in the feature-vector space.

In some embodiments, the semantic-network UI enables a user to create one or more event nodes, wherein each event node is associated with one or more lower-level semantic nodes or event nodes. It also enables the user to create one or more action nodes, wherein each action node is associated with an event node and specifies an action to take in response to detecting an event associated with the event node.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
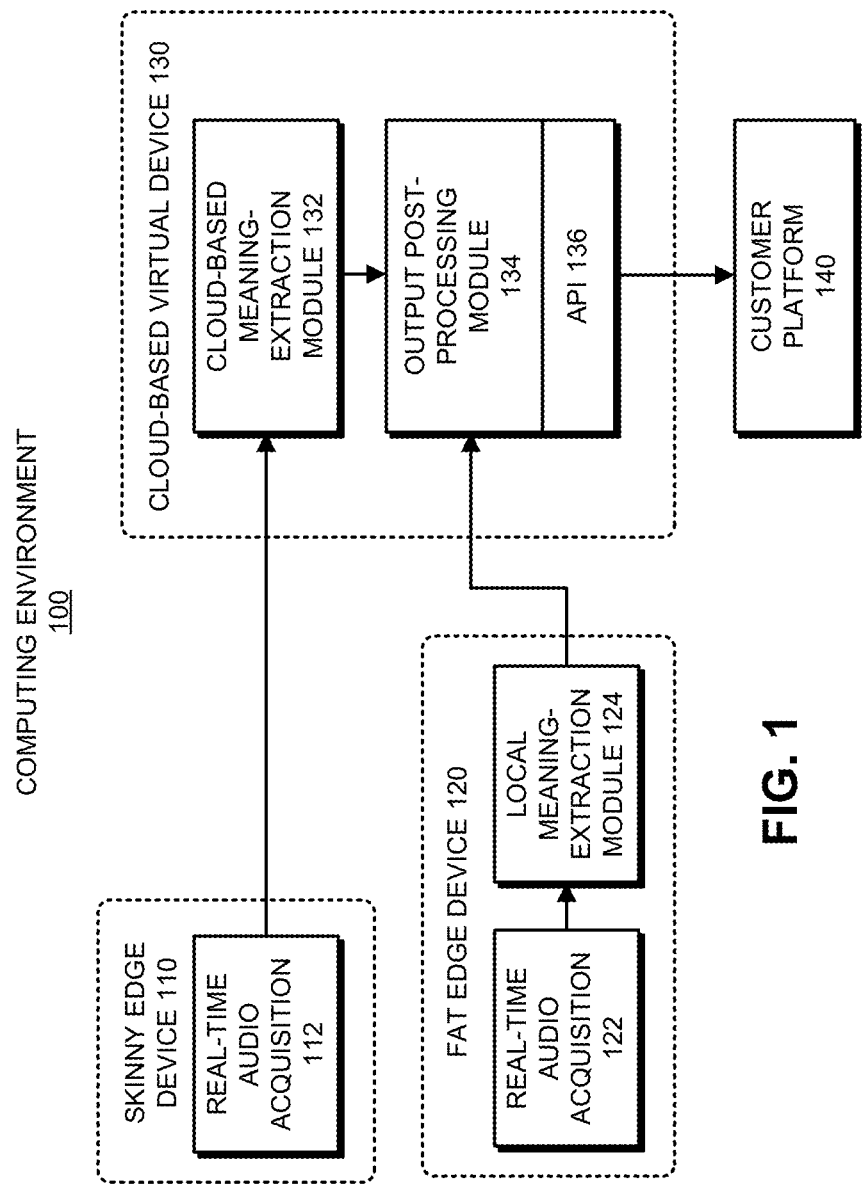
FIG. 1 illustrates a computing environment in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The objective of sound-recognition systems is to provide humans with relevant information extracted from sounds. People recognize sounds as belonging to specific categories, such as sounds associated with a car, sounds associated with a baby crying, or sounds associated with shattering glass. However, a car can produce a wide variety of sounds that a person can recognize as falling into the car category. This is because a person typically has experienced sounds related to cars for many years, and all of these sounds have been incorporated into a semantic category associated with the concept of a car.

At present, a sound category such as "car" does not make sense to a computer system. This is because a category for the concept of "car" is not actually a category associated with lower-level sound characteristics, but is in fact a "semantic category" that is associated with the activity of operating a car. In this example, the sound-recognition process is actually the process of identifying an "activity" associated with one or more sounds.

When a computer system processes an audio signal, the computer system can group similar sounds into categories based on patterns contained in the audio signal, such as patterns related to frequencies and amplitudes of various components of the audio signal. Note that such sound categories may not make sense to people; however, the computer system can easily categorize these sound categories, which we refer to as "sound primitives." (Note that the term "sound primitive" can refer to both machine-generated sound categories, and human-defined categories matching machine-generated sound categories.) We refer to the discrepancy between human-recognized sound categories and machine-recognized sound categories as the "human-machine semantic gap."

We now describe a system that monitors an audio stream to recognize sound-related activities based on patterns of sound primitives contained in the audio stream. Note that these patterns of sound primitives can include sequences of sound primitives and also overlapping sound primitives.

Computing Environment

FIG. 1 illustrates a computing environment 100 in accordance with the disclosed embodiments. Computing environment 100 includes two types of device that can acquire sound, including a skinny edge device 110, such as a live-streaming camera, and a fat edge device 120, such as a smartphone or a tablet. Skinny edge device 100 includes a real-time audio acquisition unit 112, which can acquire and digitize an audio signal. However, skinny edge device 110 provides only limited computing power, so the audio signals are pushed to a cloud-based meaning-extraction module 132 inside a cloud-based virtual device 130 to perform meaning-extraction operations. Note that cloud-based virtual device 130 comprises a set of software resources that can be hosted on a remote enterprise-computing system, such as the Amazon Web Services™ (AWS) system.

Fat edge device 130 also includes a real-time audio acquisition unit 122, which can acquire and digitize an audio signal. However, in contrast to skinny edge device 110, fat edge device 120 possesses more internal computing power, so the audio signals can be processed locally in a local meaning-extraction module 124.

The output from both local meaning-extraction module 124 and cloud-based meaning-extraction module 132 feeds into an output post-processing module 134, which is also located inside cloud-based virtual device 130. This output post-processing module 134 provides an Application-Programming Interface (API) 136, which can be used to communicate results produced by the sound-recognition process to a customer platform 140.

Figure 2:
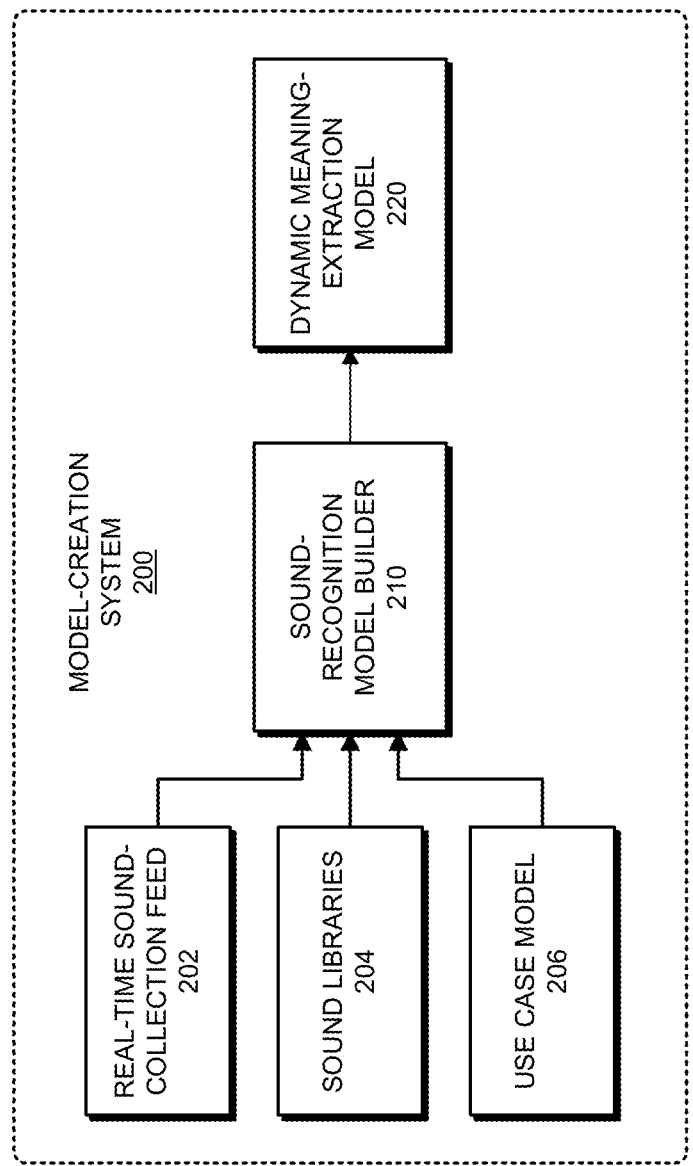
FIG. 2 illustrates a model-creation system in accordance with the disclosed embodiments.

Referring to the model-creation system 200 illustrated in FIG. 2, both local meaning-extraction module 124 and cloud-based meaning-extraction module 132 make use of a dynamic meaning-extraction model 220, which is created by a sound-recognition model builder unit 210. This sound-recognition model builder unit 210 constructs and periodically updates dynamic meaning-extraction model 220 based on audio streams obtained from a real-time sound-collection feed 202 and from one or more sound libraries 204 and a use case model 206. This model-building and updating process is described in more detail below with reference to FIGS. 3 and 4.

Model-Building Process

Figure 3:
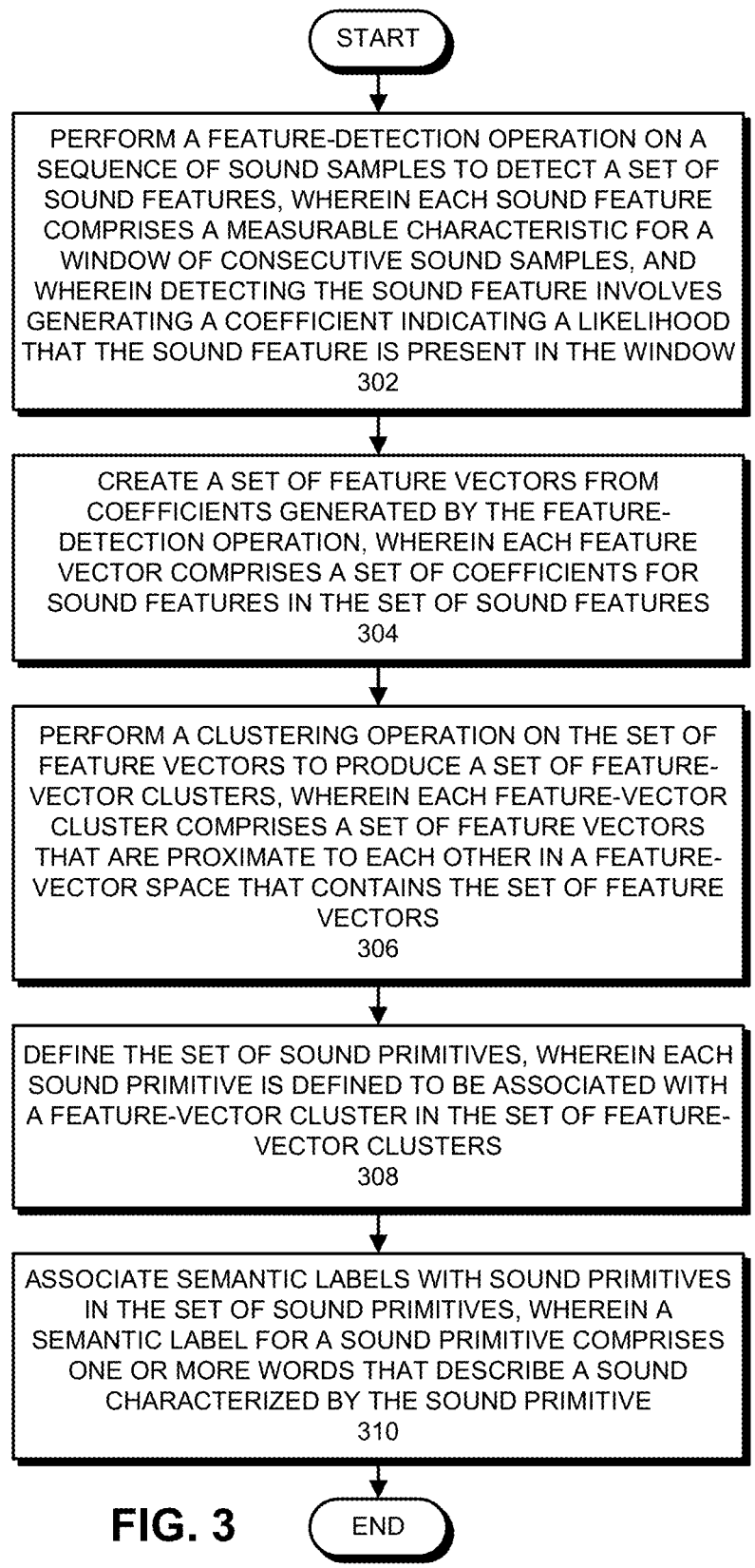
FIG. 3 presents a flow chart illustrating a technique for generating a set of sound primitives through an unsupervised learning process in accordance with the disclosed embodiments.

During the model-building process, the system can use an unsupervised learning technique to generate a model to recognize a set of sound primitives as is illustrated in the flow chart that appears in FIG. 3. First, the system performs a feature-detection operation on a sequence of sound samples to detect a set of predefined sound features, wherein each sound feature comprises a measurable characteristic for a window of consecutive sound samples, and wherein detecting the sound feature involves generating a coefficient indicating a likelihood that the sound feature is present in the window (step 302).

For example, a sound feature can comprise a five-second sliding time window comprising a set of audio samples acquired at 46 millisecond intervals from an audio stream. In general, the set of sound features can include: (1) an average value for a parameter of a sound signal over the time window; (2) a spectral-content-related parameter for a sound signal over the time window; and (3) a shape-related metric for a sound signal over the time window. More specifically, the set of sound features can include: (1) a "pulse" that comprises a peak in intensity of a highest energy component of the sound signal, which can be compared against a delta function, and wherein parameters for the pulse can include a total energy, a duration, and a peak energy; (2) a "shock ratio," which relates to a local variation in amplitude of the sound wave; (3) a "wave-linear length," which measures a total length of the sound wave over the time window; (4) a "spectral composition of a peak" over the time window; (5) a "trajectory of the leading spectrum component" in the sound signal over the time window; for example, the trajectory can be ascending, descending or V-shaped; (6) a "leading spectral component" (or a set of leading spectral components) at each moment in the time window; (7) an "attack strength," which reflects a most brutal variation in sound intensity over the time window; and (8) a "high-peak number," which specifies a number of peaks that are within 80% of the peak amplitude in the time window.

Note that it is advantageous to use a sound feature that can be computed using simple incremental computations instead of more-complicated computational operations. For example, the system can compute the "wave-linear length" instead of the more computationally expensive signal-to-noise ratio (SNR).

Next, the system creates a set of feature vectors from coefficients generated by the feature-detection operation, wherein each feature vector comprises a set of coefficients for sound features in the set of sound features (step 304). The system then performs a clustering operation on the set of feature vectors to produce a set of feature-vector clusters, wherein each feature-vector cluster comprises a set of feature vectors that are proximate to each other in a feature-vector space that contains the set of feature vectors (step 306). This clustering operation can involve any known clustering technique, such as the "k-means clustering technique," which is commonly used in data mining systems. This clustering operation also makes use of a distance metric, such as the "normalized Google distance," to form the clusters of proximate feature vectors.

The system then defines the set of sound primitives, wherein each sound primitive is defined to be associated with a feature-vector cluster in the set of feature-vector clusters (step 308). Finally, the system associates semantic labels with sound primitives in the set of sound primitives, wherein a semantic label for a sound primitive comprises one or more words that describe a sound characterized by the sound primitive (step 310).

Figure 4:
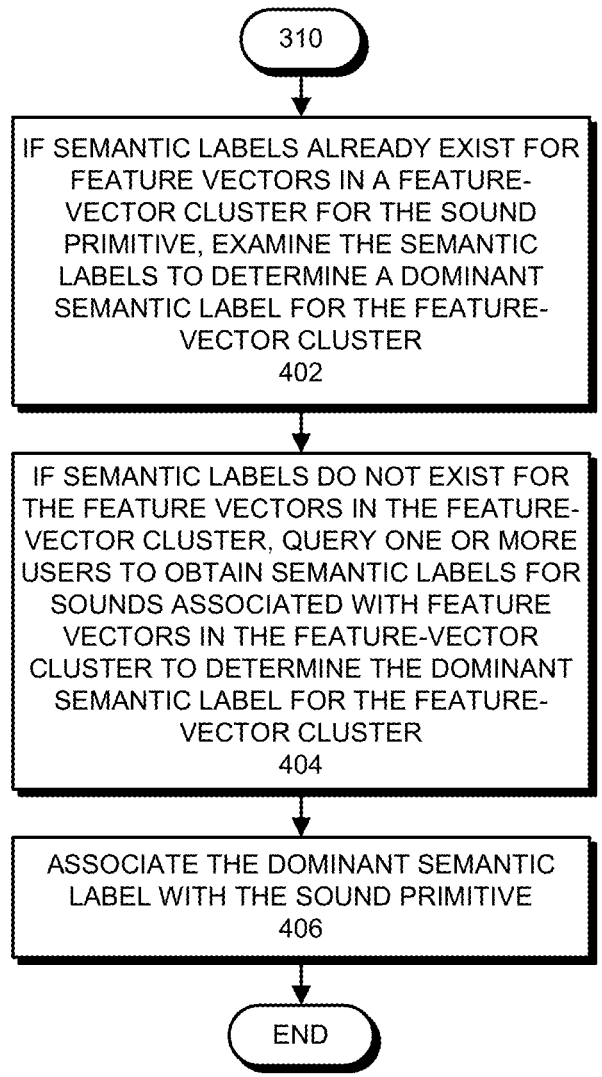
FIG. 4 presents a flow chart illustrating the semantic-labeling process in accordance with the disclosed embodiments.

Referring to the flow chart in FIG. 4, the label-association process of step 310 involves a number of operations. If semantic labels already exist for feature vectors in a feature-vector cluster for the sound primitive, the system examines the semantic labels to determine a dominant semantic label for the feature-vector cluster (step 402). For example, the dominant semantic label can be the most-common semantic label across all of the feature vectors that comprise a feature-vector cluster. On the other hand, if semantic labels do not exist for the feature vectors in the feature-vector cluster, the system can query one or more users to obtain semantic labels for sounds associated with feature vectors in the feature-vector cluster to determine the dominant semantic label for the feature-vector cluster (step 404). Finally, the system associates the dominant semantic label with the sound primitive (step 406).

After the model for recognizing the set of sound primitives has been generated, the system generates a model that recognizes "events" from patterns of lower-level sound primitives. Like sound primitives, events are associated with concepts that have a semantic meaning, and are also associated with corresponding semantic labels. Moreover, each event is associated with a pattern of one or more sound primitives, wherein the pattern for a particular event can include one or more sequences of sound primitives, wherein the sound primitives can potentially overlap in the sequences. For example, an event associated with the concept of "wind" can be associated with sound primitives for "rustling" and "blowing." In another example, an event associated with the concept of "washing dishes" can be associated with a sequence of sound primitives, which include "metal clanging," "glass clinking" and "running water."

Note that the model that recognizes events can be created based on input obtained from a human expert. During this process, the human expert defines each event in terms of a pattern of lower-level sound primitives. Moreover, the human expert can also define higher-level events based on patterns of lower-level events. For example, the higher-level event "storm" can be defined as a combination of the lower-level events "wind," "rain" and "thunder." Instead of (or in addition to) receiving input from a human expert to define events, the system can also use a machine-learning technique to make associations between lower-level events and higher-level events based on feedback from a human expert as is described in more detail below. Once these associations are determined, the system converts the associations into a grammar that is used by a non-deterministic infinite-state automaton to recognize events as is described in more detail below.

Figure 5:
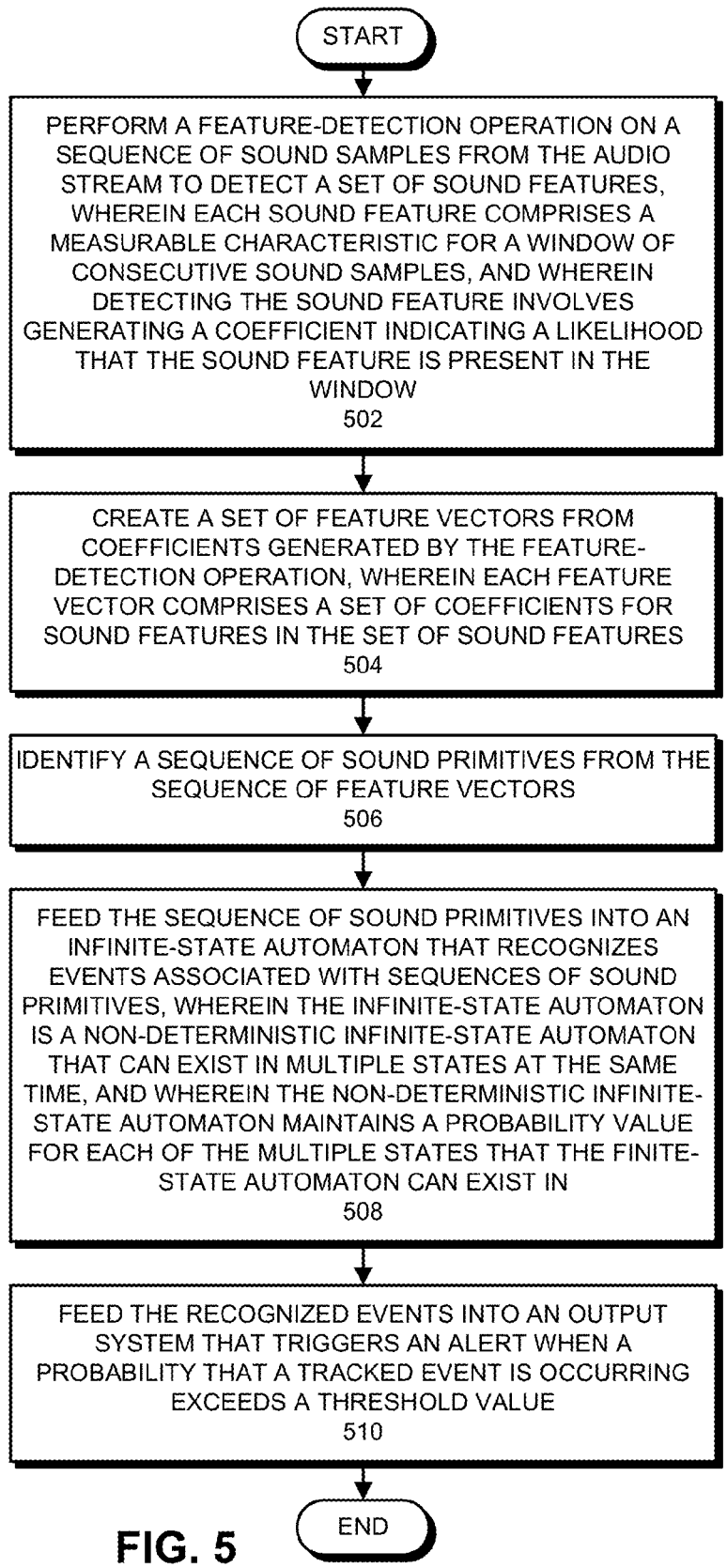
FIG. 5 presents a flow chart illustrating the sound-recognition process in accordance with the disclosed embodiments.

Note that a sound primitive can be more clearly defined by examining other temporally proximate sound primitives. For example, the sound of an explosion can be more clearly defined as a gunshot if it is followed by more explosions, the sound of people screaming, and the sound of a police siren. In another example, a sound that could be either a laugh or a bark can be more clearly defined as a laugh if it is followed by the sound of people talking Sound-Recognition Process FIG. 5 presents a flow chart illustrating the sound-recognition process that recognizes a sequence of sound primitives in an audio stream in accordance with the disclosed embodiments. During this process, the system performs a feature-detection operation on a sequence of sound samples from the audio stream to detect a set of sound features, wherein each sound feature comprises a measurable characteristic for a window of consecutive sound samples, and wherein detecting the sound feature involves generating a coefficient indicating a likelihood that the sound feature is present in the window (step 502). Next, the system creates a set of feature vectors from coefficients generated by the feature-detection operation, wherein each feature vector comprises a set of coefficients for sound features in the set of sound features (step 504). Then, the system identifies the sequence of sound primitives from the sequence of feature vectors (step 506).

Next, the system feeds the sequence of sound primitives into an infinite-state automaton that recognizes events associated with sequences of sound primitives. This infinite-state automaton can be a non-deterministic infinite-state automaton that can exist in multiple states at the same time, wherein the non-deterministic infinite-state automaton maintains a probability value for each of the multiple states that the infinite-state automaton can exist in (step 508). Finally, the system feeds the recognized events into an output system that triggers an alert when a probability that a tracked event is occurring exceeds a threshold value (step 510).

Figure 6:
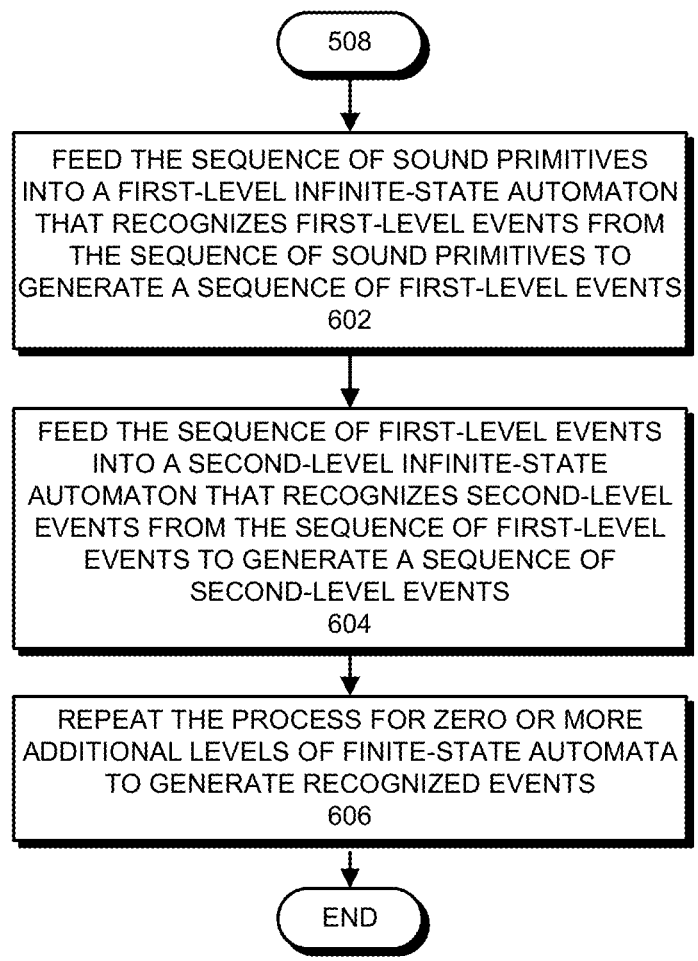
FIG. 6 presents a flow chart illustrating how a multi-level infinite-state automaton operates in accordance with the disclosed embodiments.

FIG. 6 presents a flow chart illustrating how the multi-level infinite-state automaton (that is described with respect to state 512 above) operates in accordance with the disclosed embodiments. The system first feeds the sequence of sound primitives into a first-level infinite-state automaton that recognizes first-level events from the sequence of sound primitives to generate a sequence of first-level events (step 602). Next, the system feeds the sequence of first-level events into a second-level infinite-state automaton that recognizes second-level events from the sequence of first-level events to generate a sequence of second-level events (step 604). The system repeats this process for zero or more additional levels of infinite-state automata to generate the recognized events (step 606).

EXAMPLE

Figure 7:
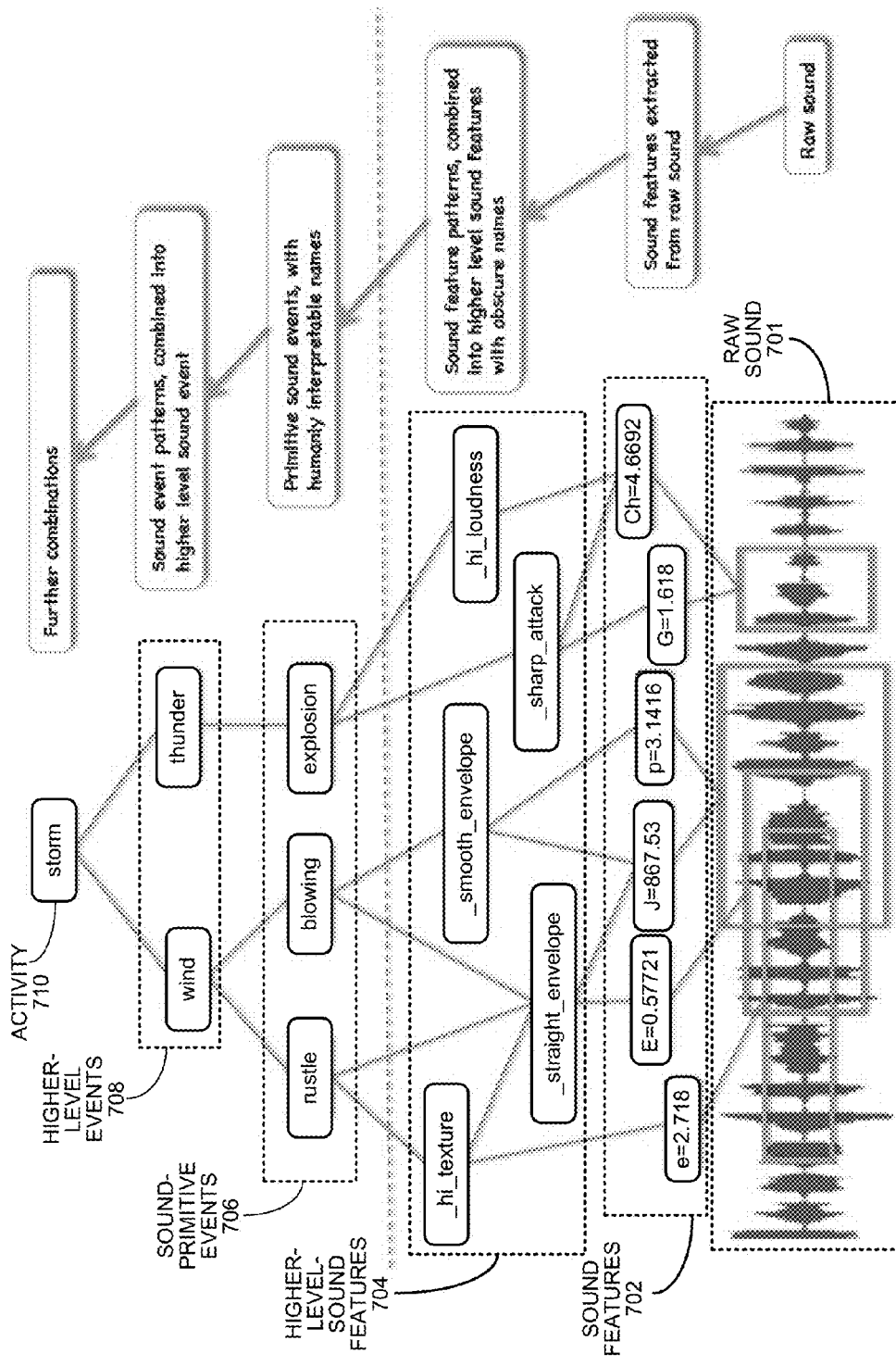
FIG. 7 presents a diagram illustrating an exemplary sound-recognition process in accordance with the disclosed embodiments.

FIG. 7 presents a diagram illustrating an exemplary sound-recognition process in accordance with the disclosed embodiments. The system starts with an audio stream to be recognized comprising raw sound 701. Next, as described above with reference to FIG. 5, the system extracts a set of sound features 702 from the raw sounds 701, wherein each sound feature is associated with a numerical value. The system then combines patterns of sound features into higher-level sound features 704, such as "_smooth_envelope," or "_sharp_attack." These higher-level sound features 704 are then combined into sound-primitive events 706, which are associated with semantic labels, and have a meaning that is understandable to people, such as a "rustling, a "blowing" or an "explosion." Next, these sound-primitive events 706 are combined into higher-level events 708. For example, rustling and blowing sounds can be combined into wind, and an explosion can be correlated with thunder. Finally, the higher-level sound events wind and thunder 708 can be combined into a recognized activity 710, such as a storm.

Non-Deterministic Infinite-State Automaton

Figure 8:
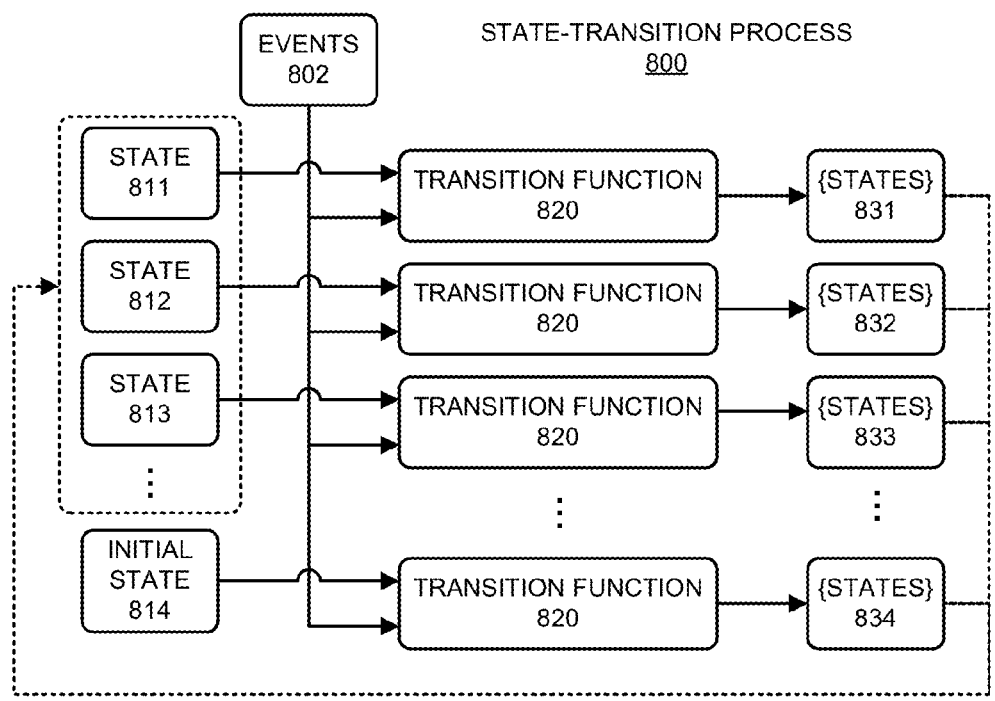
FIG. 8 presents a flow diagram illustrating a state-transition process for a non-deterministic infinite-state automaton in accordance with the disclosed embodiments.

As mentioned above, the system can recognize events based on other events (or from sound primitives) through use of a non-deterministic infinite-state automaton. An exemplary state-transition process 800 for an exemplary non-deterministic infinite-state automaton is illustrated in FIG. 8. As illustrated in FIG. 8, the state-transition process 800 makes use of a transition function 820, which maps a state and a set of events 802 into a set of states. For example, the system can start in an initial state 814, which feeds into transition function 820 along with a set of previously computed events 802 to generate a set of states 834, wherein the set of states 834 can be a vector with a coefficient (from zero to one) for each state. As illustrated in FIG. 8, each state (811, 812, 813, . . . ) in the set of states 834 feeds back around into transfer function 820 to be combined with events 802 to produce another set of states (e.g., sets of state 831, 832, 833, . . . ). Note states with coefficients that fail to reach an "activation potential threshold" value can be pruned by setting the associated state coefficients to zero. This pruning operation helps to prevent an explosion in the number of active states. The above-described state-transition process continually repeats during the sound-recognition process.

Matrix Operations

Figure 9:
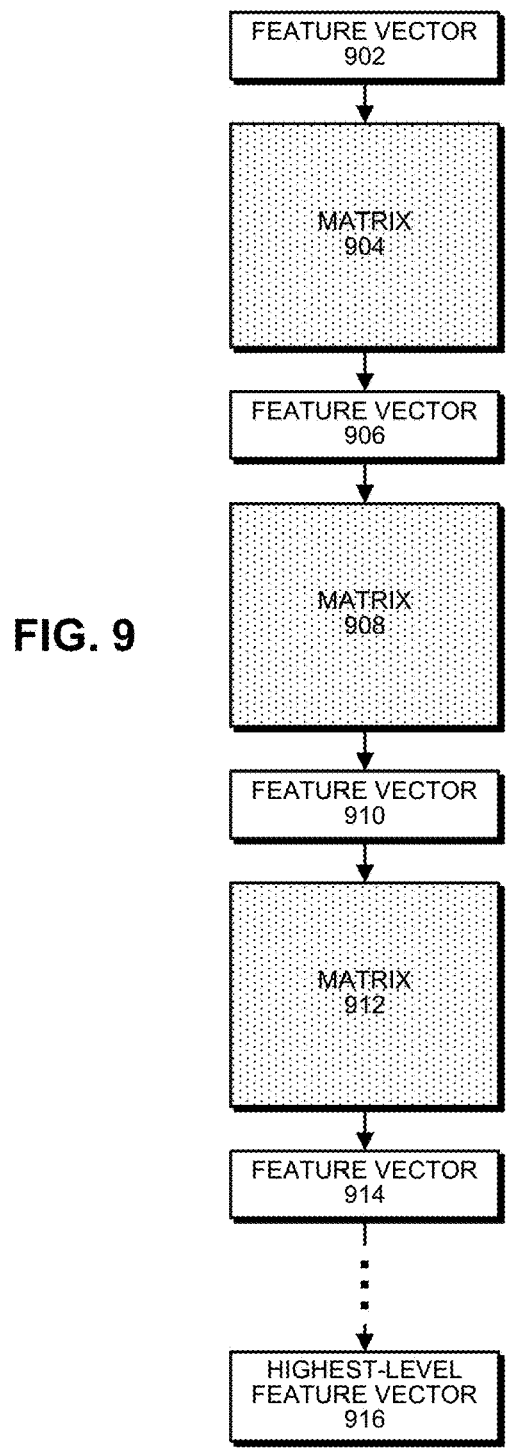
FIG. 9 illustrates a set of matrix operations that are used during the sound-recognition process in accordance with the disclosed embodiments.

FIG. 9 illustrates a set of matrix operations that are used during the sound-recognition process in accordance with the disclosed embodiments. Each of the levels illustrated in FIG. 7 above is associated with a set of features, which are stored in a corresponding feature vector, and these feature vectors 902, 906, 910 and 914 are transformed by intervening matrices 904, 908, and 912 to become higher-level feature vectors. More specifically, feature vector 902 is transformed by matrix 904 to become a higher-level feature vector 906; feature vector 906 is transformed by matrix 908 to become a higher-level feature vector 910; and feature vector 910 is transformed by matrix 912 to become a higher-level feature vector 914. The highest-level feature vector 916 is a result vector, which can be passed on to a client. For example, the lowest-level feature vector 902 can be comprised of sound features, the higher-level feature vector 910 can be comprised of sound primitives, and the highest-level feature vector 916 can be comprised of events. (Note that there can exist additional levels of matrices and feature vectors between feature vector 914 and feature vector 916.)

In some embodiments, the system receives feedback from a human who reviews the highest-level feature vector 916 and also listens to the associated audio stream, and then provides feedback about whether the highest-level feature vector 916 is consistent with the audio stream. This feedback can be used to modify the lower-level matrices through a machine-learning process to more accurately produce higher-level feature vectors. Note that this system can use any one of a variety of well-known machine-learning techniques to modify these lower-level matrices.

User Interfaces to Facilitate Model Building

It is often advantageous to use human input to guide the model-building process. For example, as mentioned above, human input indicating whether a high-level feature vector is consistent with an associated audio stream can be used to modify the lower-level matrices illustrated in FIG. 9. Also, human input can be used to provide semantic labels for sound samples as described above with reference to FIG. 4.

Figure 10A:
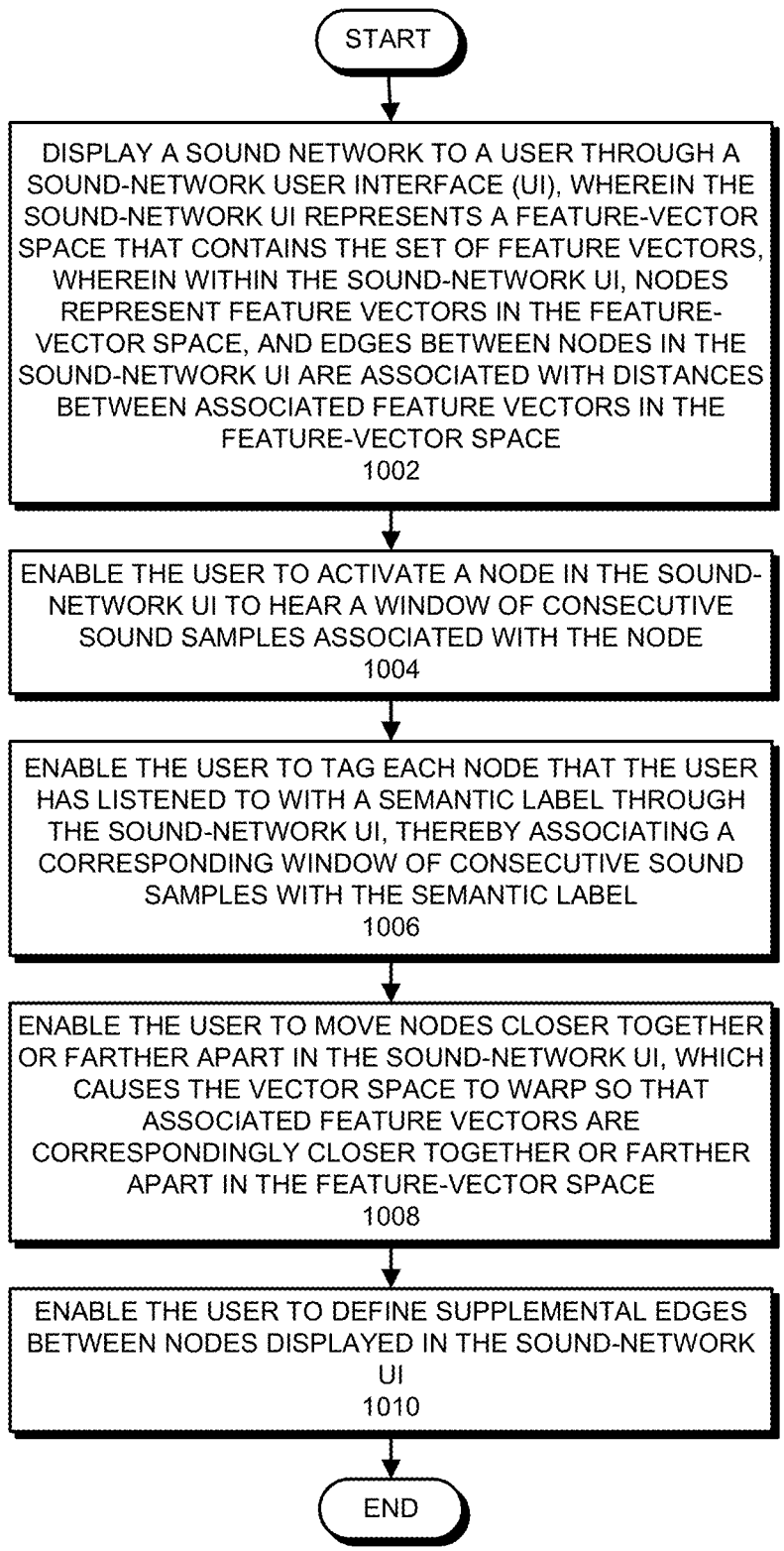
FIG. 10A presents a flow chart illustrating how a sound-network UI is presented to a user in accordance with the disclosed embodiments.

The disclosed embodiments can also provide user interfaces to facilitate the model-building process. For example, FIG. 10A presents a flow chart illustrating how a sound-network UI can be presented to a user in accordance with the disclosed embodiments. First, the system displays a sound network to a user through a sound-network user interface (UI), wherein the sound-network UI represents the feature-vector space that contains the set of feature vectors. Within this sound-network UI, nodes represent feature vectors in the feature-vector space, and edges between nodes in the sound-network UI are associated with distances between associated feature vectors in the feature-vector space (step 1002).

At the start of this display operation, the system can perform various initialization operations. For example, the system can perform scaling and normalization operations on the feature values based on upper and lower bounds, so that the ranges of values for the features are all within the same order of magnitude. The system can also perform a principal component analysis (PCA) operation on the set of feature vectors to produce a set of linearly uncorrelated variables (principal components), which can be used in place of the individual features. Note that the PCA operation is a linear transform that eliminates correlated features, and can thereby dramatically reduce the dimensionality of the feature-vector space. For example, an exemplary feature-vector space associated with 1,000 features can be transformed into a reduced feature-vector space having 33 linearly uncorrelated variables.

During the display operation, the system only displays nodes associated with a selected subset of the set of feature vectors. Note that it is not practical to display many thousands of nodes in the sound-network UI, because the sound-network UI has limited screen space. As a consequence, in cases where there exist many thousands of feature vectors, the system selects a subset of the feature vectors to represent as nodes in the sound-network UI. However, it is a challenging task to select a representative set of feature vectors. Many feature vectors are similar, and these similar feature vectors can be dealt with by clustering the similar feature vectors and selecting a representative subset from each cluster. However, many important feature vectors are outliers, which occur infrequently, such as feature vectors associated with a gunshot or breaking glass. It is also important to select these infrequent outliers.

Moreover, for nodes that are displayed in the sound-network UI, it may be impractical to display all of the possible edges connecting the nodes. Hence, the system can select a representative subset of the possible edges to display. For example, the system can perform a Delauney triangulation among the nodes to select a representative subset of the edges.

After the sound-network UI is displayed to the user, the system enables the user to activate (select) a node in the sound-network UI to hear a window of consecutive sound samples associated with the node (step 1004). The system also enables the user to tag each node that the user has listened to with a semantic label through the sound-network UI, thereby associating a corresponding window of consecutive sound samples with the semantic label (step 1006).

The above-described listening and tagging process facilitates identifying clusters of feature vectors. Initially, the user is able to view clusters of nodes produced through the sound-network UI, wherein the clusters are produced by an unsupervised learning process. Next, the user can listen to nodes in each cluster and tag them. The user can also listen to nearby neighboring nodes to each cluster and can tag them. Eventually, most of the nodes in each cluster get tagged. Note that the user can also adjust a "tag gravity" parameter, which causes nodes with the same tag to be attracted to each other, thereby causing them to move closer together in the sound-network UI.

The system also enables the user to move nodes closer together or farther apart in the sound-network UI, which causes the feature-vector space to warp so that associated feature vectors are correspondingly closer together or farther apart in the feature-vector space (step 1008). This ability to warp the feature-vector space is valuable because it enables a user to optimize each feature's relative importance in separating dissimilar nodes and bringing similar nodes together. In the raw feature-vector space, some regions may contain a mix of semantically different nodes. The user can "stretch out" these mixed regions by separating semantically different nodes so that the distances among the semantically different nodes are larger. Conversely, other regions may contain a large number of semantically similar nodes, and the user can move these semantically similar nodes closer together to reduce the size of these regions. For example, the user can move nodes that are tagged with the word "car" closer to nodes that are tagged with the word "truck" because cars are similar to trucks. However, the user can also move nodes that are tagged with the word "car" farther away from nodes that are tagged with "crying baby," because a car is not similar to a crying baby. In this way the user can manipulate the sound-network UI by moving nodes closer together or farther apart to reflect their relative semantic differences, thus injecting human semantics into the system. Also note that because of the forces exerted by the edges linking similar nodes, moving a given node will also cause similar nodes to move.

The system also enables the user to define supplemental edges between nodes displayed in the sound-network UI (step 1010). Adding a supplemental edge between two nodes enables the user to specify whether the two nodes are close together or far apart. This is because each edge in the sound network has a "default length," wherein compressing or stretching the edge away from the default length creates an opposing force that seeks to restore the edge to the default length.

While adding supplemental edges, it is advantageous to add edges that increase the total amount of information about similarity relationships. For example, suppose we know that node A is close to node B, node B is close to node C, and node D is far from all of them. We can infer that node C is close to node A, so it is not advantageous to add an edge between node C and node A. However, if we add an edge between nodes B and D, which says that node B is far from node D, then we can infer that nodes A and C are also far from node D.

Figure 10B:
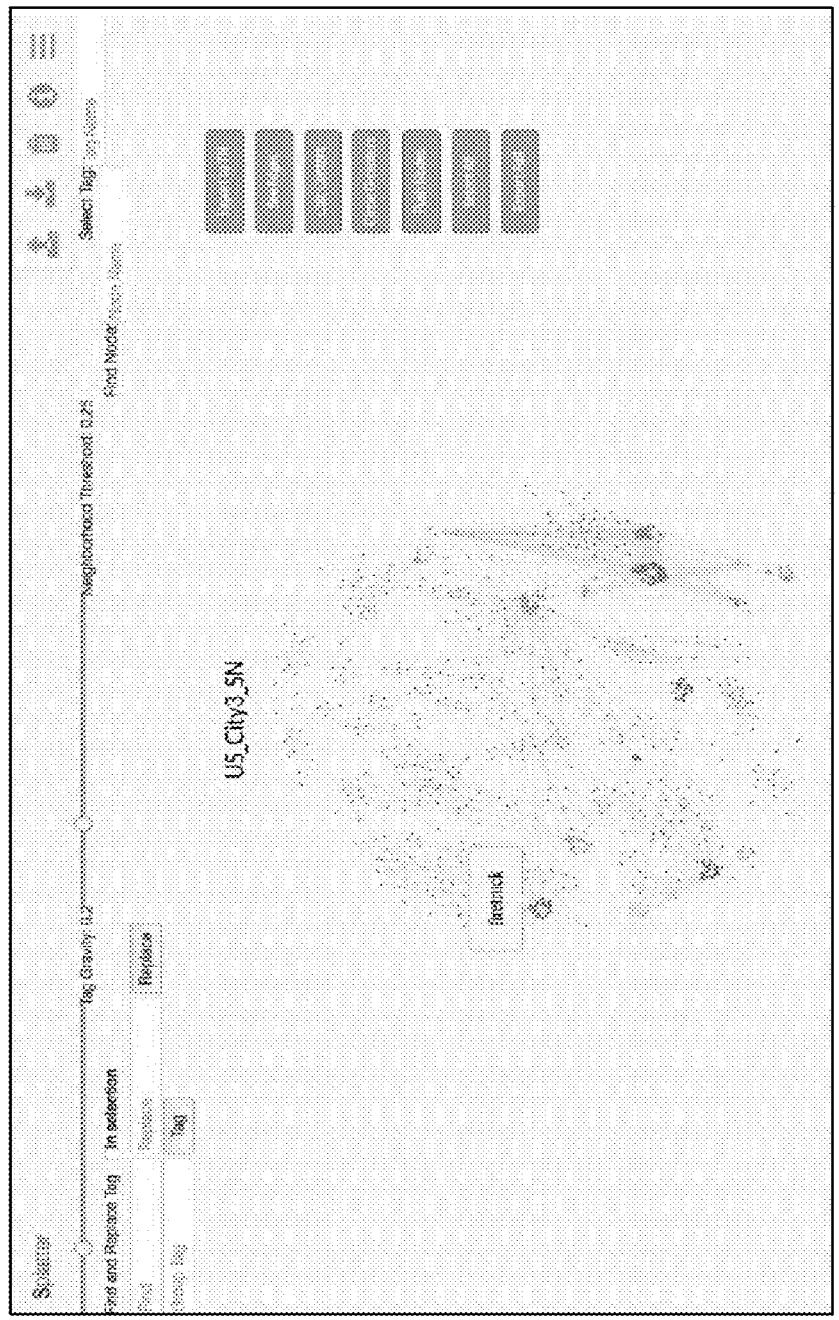
FIG. 10B illustrates an exemplary sound-network UI in accordance with the disclosed embodiments.

FIG. 10B illustrates an exemplary sound-network UI in accordance with the disclosed embodiments. In FIG. 10B, the feature-vector space is projected into two dimensions to be displayed on the sound-network UI. As illustrated in FIG. 10B, each node is represented as a dot, wherein the dots are grouped into clusters representing nodes that are close together in the feature-vector space. Initially, every dot is gray, and when a dot is tagged by a user the dot gets colored with a specific color associated with the tag. Also note that each cluster of nodes has a "center of gravity," which is calculated as a weighted average of the locations of all of the nodes in the cluster.

Figure 11A:
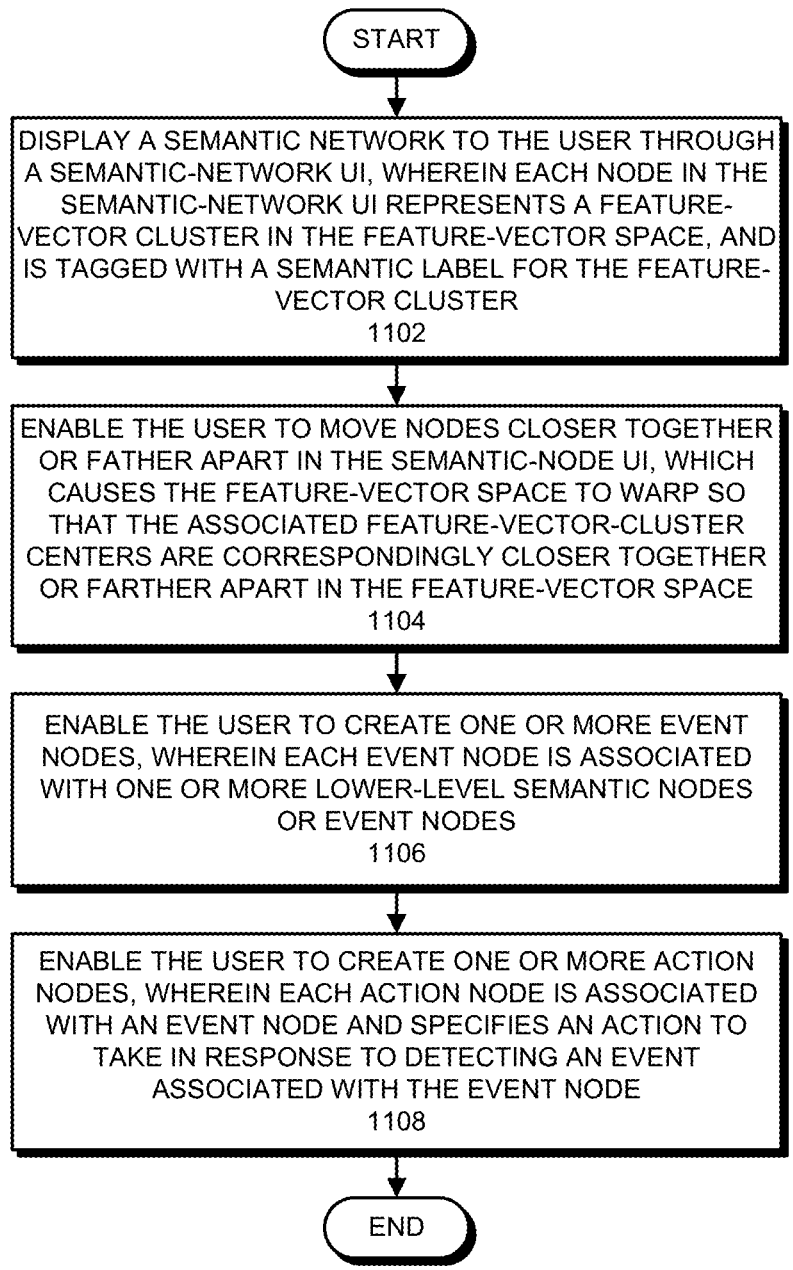
FIG. 11A presents a flow chart illustrating how a semantic-network UI is presented to a user in accordance with the disclosed embodiments.

After the clusters are tagged and associated with colors, the system can represent these clusters of nodes in a "semantic-network UI." For example, FIG. 11A presents a flow chart illustrating how a semantic-network UI is presented to a user in accordance with the disclosed embodiments. First, the system displays the semantic network to the user through a semantic-network UI, wherein each node in the semantic-network UI represents a feature-vector cluster in the feature-vector space, and is tagged with a semantic label for the feature-vector cluster (step 1102).

Next, the system enables the user to move nodes closer together or farther apart in the semantic-network UI, which causes the feature-vector space to warp so that the associated feature-vector-cluster centers are correspondingly closer together or farther apart in the feature-vector space (step 1104). For example, the user can move nodes associated with synonyms and meronyms closer together in the semantic-network UI, which will cause the feature-vector space to warp so that nodes associated with the synonyms and meronyms will be closer together in the feature-vector space. In another example, the user can move traffic-related noises, such as honking horns and engine noise, closer together, even though such noises may not be similar to each other. The user can also move crowd-related noises, such as crowd panic and crowd screams, closer together.

Note that it is possible for nodes associated with the same semantic tag to be dissimilar. For example, cars may be less similar to other cars than trucks are to other trucks. Also, in some of the disclosed embodiments a "rest of the world" (ROW) tag is applied to every node that is not explicitly tagged, and this ROW tag can have a zero self-similarity value. Hence, nodes associated with some tags need to be more together, and nodes associated with other tags need to be more separated. To deal with these self-similarity differences, each semantic label can be associated with a self-similarity value, which indicates a level of self-similarity among nodes that share the semantic label. The system can then use these self-similarity values to ensure that nodes that share a semantic label with a higher level of self-similarity tend to be closer together in feature-vector space than nodes that share a semantic label with a lower level of self-similarity.

After relationships among semantic tags have been manipulated in the semantic-network UI, these relationships can be re-injected into the feature-vector space. We would ideally like our original feature-vector space to be warped in such a way that distance better represents similarity in the semantic space. In some cases, this can simply involve changing weights associated with individual features in the feature-vector space, which provides a linear transformation. However, in other cases, a non-linear transformation can be implemented by providing movable pegs in the feature-vector space that can be moved to stretch the feature-vector space in a non-linear manner in local regions. Note that we need to limit the number of pegs to make this technique tractable.

The system also enables the user to create one or more event nodes, wherein each event node is associated with one or more lower-level semantic nodes or event nodes (step 1106). For example, the user can create an event node labeled "storm," and can link this node to the lower-level nodes "wind" and "thunder" in the semantic-network UI.

The system additionally enables the user to create one or more action nodes, wherein each action node is associated with an event node and specifies an action to take in response to detecting an event associated with the event node (step 1108). For example, the user can create an action node labeled "send alert," and can link this action node to the event node labeled "storm."

Figure 11B:
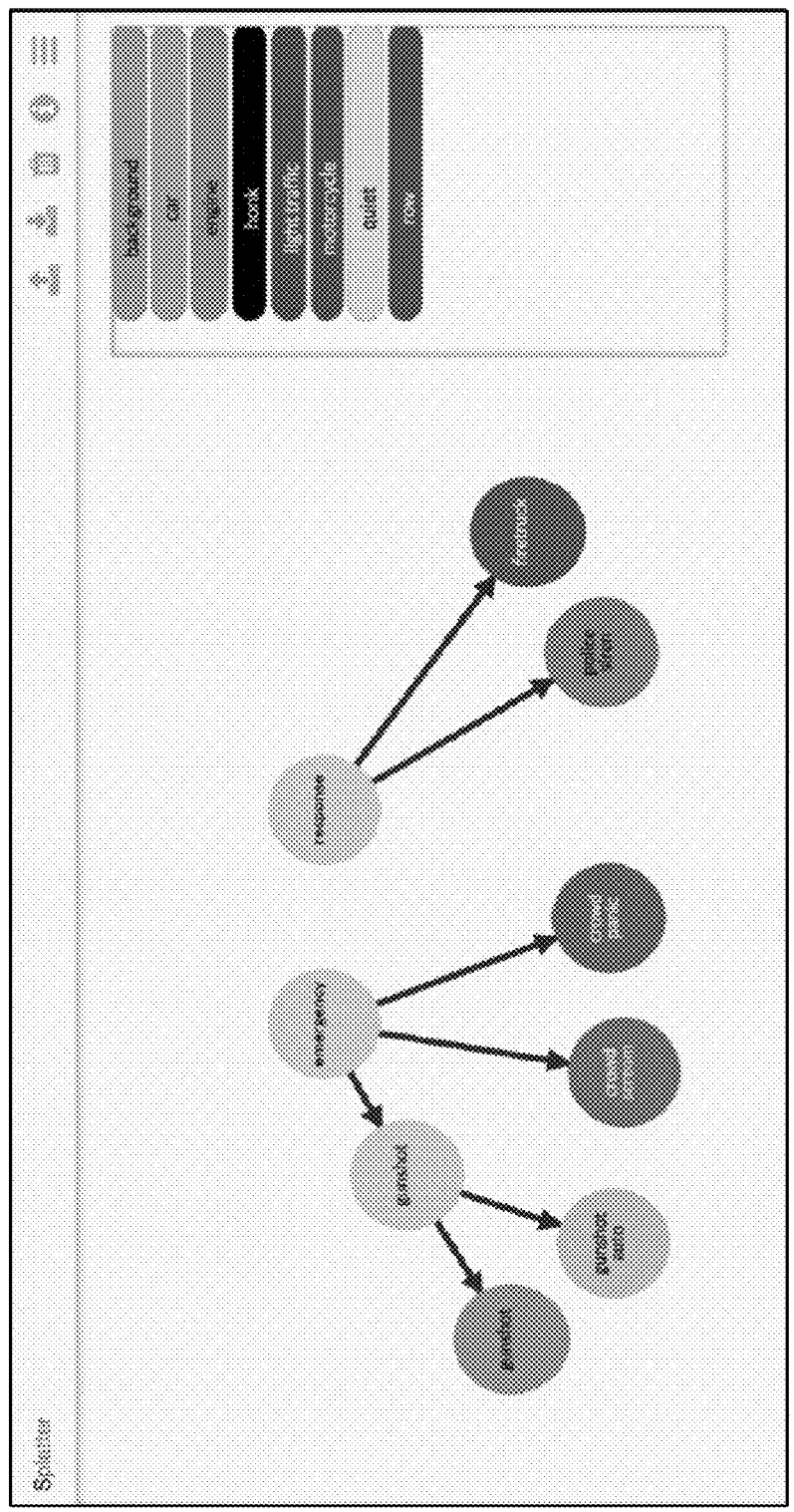
FIG. 11B illustrates an exemplary semantic-network UI in accordance with the disclosed embodiments.

FIG. 11B illustrates an exemplary semantic-network UI in accordance with the disclosed embodiments. The colored nodes in the semantic-network UI represent clusters from the sound-network UI, and the gray nodes represent higher-level event nodes. Moreover, the edges between the nodes represent semantic relationships between the nodes.

Figure 12:
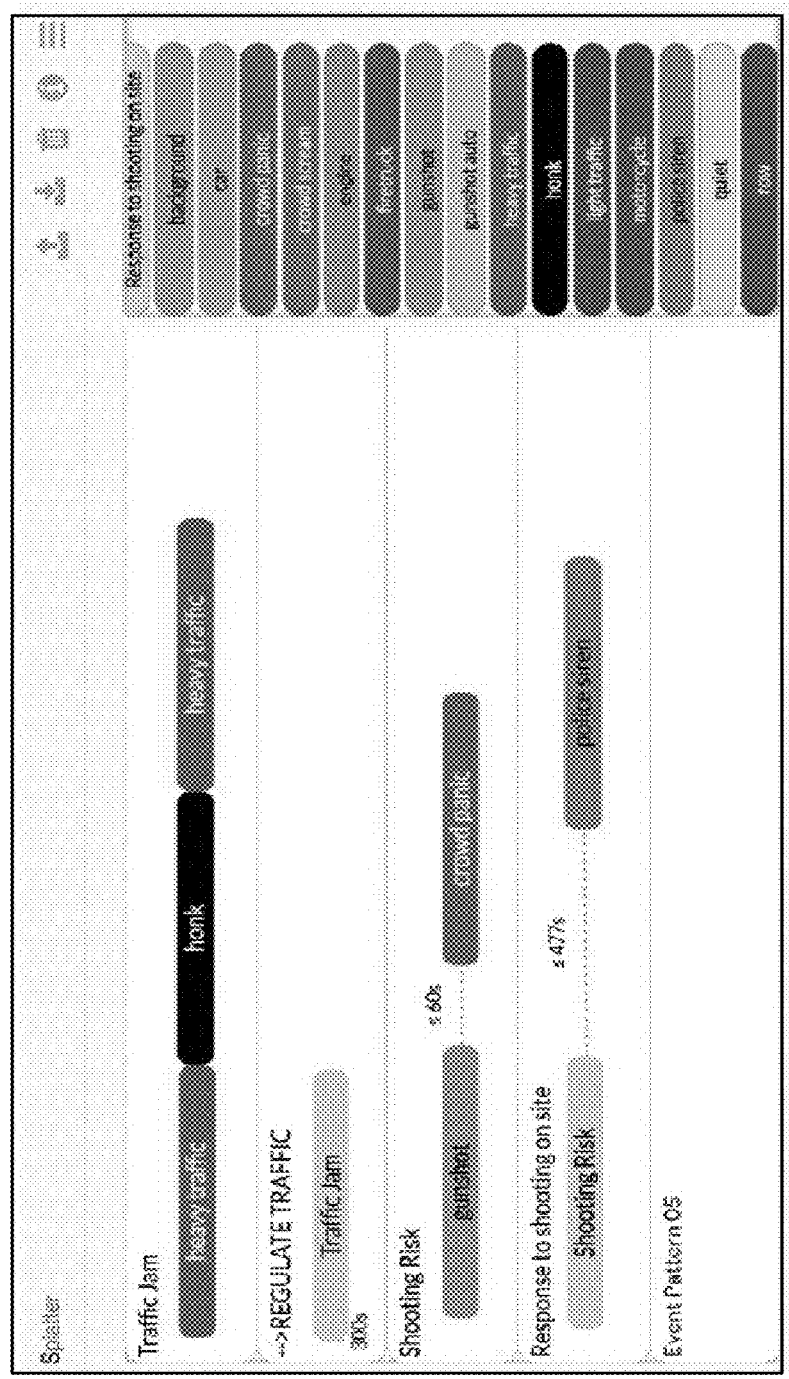
FIG. 12 illustrates an exemplary sequence UI that displays recognized sequences of events in accordance with the disclosed embodiments.

Finally, FIG. 12 illustrates an exemplary "sequence UI" that displays recognized sequences of events in accordance with the disclosed embodiments. For example, a sequence of sounds of heavy traffic interspersed with honking sounds can be recognized as a traffic jam. When a traffic jam is recognized, it can be associated with a "regulate traffic" action. Also, the sound of a gunshot followed less than 60 seconds later by the sound of crowd panic can be recognized as a shooting risk. Moreover, a shooting risk followed less than 477 seconds later by the sounds of a police siren can be recognized as a "response to shooting on site."

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for generating sound primitives, comprising:
    performing a feature-detection operation on sound samples to detect a set of sound features, wherein each sound feature comprises a measurable characteristic of a window of consecutive sound samples, and wherein detecting the sound feature involves generating a coefficient indicating a likelihood that the sound feature is present in the window;
    creating a set of feature vectors from coefficients generated by the feature-detection operation, wherein each feature vector is associated with a window of consecutive sound samples and comprises a set of coefficients for sound features detected in the window;
    performing a clustering operation on the set of feature vectors to produce a set of feature-vector clusters, wherein each feature-vector cluster comprises a set of feature vectors that are proximate to each other in a feature-vector space that contains the set of feature vectors;
    defining a set of sound primitives, wherein each sound primitive is associated with a feature-vector cluster in the set of feature-vector clusters;
    associating semantic labels with sound primitives in the set of sound primitives, wherein a semantic label for a sound primitive comprises one or more words that describe a sound characterized by the sound primitive;
    displaying a sound network to a user through a sound-network user interface (UI), wherein the sound-network UI represents the feature-vector space that contains the set of feature vectors, wherein nodes in the sound-network UI represent feature vectors in the feature-vector space, and wherein edges between nodes in the sound-network UI are associated with distances between associated feature vectors in the feature-vector space; and
    in response to a UI command received from the user, warping the feature-vector space to optimize the relative importance of a sound feature in separating dissimilar nodes and in bringing similar nodes together.

2. The method of claim 1, further comprising performing a sound-recognition operation that recognizes one or more sounds in an audio stream based on combinations of sound primitives detected in the audio stream.

3. The method of claim 2, wherein performing the sound-recognition operation comprises:
    recognizing a sequence of sound primitives in the audio stream; feeding the sequence of sound primitives into an infinite-state automaton that recognizes events associated with sequences of sound primitives; and
    feeding the recognized events into an output system that generates an output associated with the recognized events to be displayed to a user.

4. The method of claim 1, wherein associating a semantic label with a sound primitive comprises the following:
    if semantic labels already exist for feature vectors in a feature-vector cluster for the sound primitive, examining the semantic labels to determine a dominant semantic label for the feature-vector cluster;
    if semantic labels do not exist for the feature vectors in the feature-vector cluster, querying one or more users to obtain semantic labels for windows of consecutive sound samples associated with feature vectors in the feature-vector cluster to determine the dominant semantic label for the feature-vector cluster; and
    associating the dominant semantic label with the sound primitive.

5. The method of claim 1, wherein a sound feature includes one or more of the following:
    an average value for a parameter of a sound signal over a window of consecutive sound samples;
    a spectral-content-related parameter for a sound signal over the window of consecutive time samples; and
    a shape-related metric for a sound signal over the window of consecutive sound samples.

6. The method of claim 1, wherein the method further comprises:
   enabling the user to tag each node with a semantic label through the sound-network UI, thereby associating a corresponding window of consecutive sound samples with the semantic label; and
   enabling the user to move nodes closer together or farther apart in the sound-network UI, which causes the feature-vector space to warp so that associated feature vectors are correspondingly closer together or farther apart in the feature-vector space.

7. The method of claim 6, wherein when a node is moved in the sound-network UI, edges connecting the node with other nodes in the sound-network UI expand or contract, which changes corresponding attractive or repulsive forces exerted by the edges, thereby causing a set of directly or indirectly connected nodes in the sound-network UI to move accordingly.

8. The method of claim 6, wherein each edge in the sound network has a default length, wherein compressing or stretching the edge away from the default length creates an opposing force that seeks to restore the edge to the default length.

9. The method of claim 6, wherein displaying the sound network comprises:
   displaying a set of nodes associated with a selected subset of the set of feature vectors; and
   displaying a selected subset of edges between the set of nodes.

10. The method of claim 6, wherein when a user activates a node in the sound-network UI, a window of consecutive sound samples associated with the node is played for the user.

11. The method of claim 6, wherein the sound-network UI enables a user to define supplemental edges between nodes displayed in the sound-network UI.

12. The method of claim 6, wherein causing the feature-vector space to warp in response to the user moving nodes closer together or farther apart in the sound-network UI involves changing weights associated with features in the feature-vector space.

13. The method of claim 6, wherein each semantic label is associated with a self-similarity value, which indicates a level of self-similarity among nodes that share the semantic label, wherein nodes that share a semantic label with a higher level of self-similarity tend to be closer together in the sound-network UI than nodes that share a semantic label with a lower level of self-similarity.

14. The method of claim 6, wherein the method further comprises:
   displaying a semantic network to the user through a semantic-network UI, wherein each node in the semantic-network UI represents a feature-vector cluster in the feature-vector space, and is tagged with a semantic label for the feature-vector cluster; and
   enabling the user to move nodes closer together or farther apart in the semantic-network UI, which causes the feature-vector space to warp so that the associated feature-vector-cluster centers are correspondingly closer together or farther apart in the feature-vector space.

15. The method of claim 14, wherein the semantic-network UI enables a user to:
   create one or more event nodes, wherein each event node is associated with one or more lower-level semantic nodes or event nodes; and
   create one or more action nodes, wherein each action node is associated with an event node and specifies an action to take in response to detecting an event associated with the event node.

16. A non-transitory computer-readable storage medium storing instructions that when executed by a computer cause the computer to perform a method for generating sound primitives, the method comprising:
   performing a feature-detection operation on sound samples to detect a set of sound features, wherein each sound feature comprises a measurable characteristic of a window of consecutive sound samples, and wherein detecting the sound feature involves generating a coefficient indicating a likelihood that the sound feature is present in the window;
   creating a set of feature vectors from coefficients generated by the feature-detection operation, wherein each feature vector is associated with a window of consecutive sound samples and comprises a set of coefficients for sound features detected in the window;
   performing a clustering operation on the set of feature vectors to produce a set of feature-vector clusters, wherein each feature-vector cluster comprises a set of feature vectors that are proximate to each other in a feature-vector space that contains the set of feature vectors;
   defining a set of sound primitives, wherein each sound primitive is associated with a feature-vector cluster in the set of feature-vector clusters;
   associating semantic labels with sound primitives in the set of sound primitives, wherein a semantic label for a sound primitive comprises one or more words that describe a sound characterized by the sound primitive;
   displaying a sound network to a user through a sound-network user interface (UI), wherein the sound-network UI represents the feature-vector space that contains the set of feature vectors, wherein nodes in the sound-network UI represent feature vectors in the feature-vector space, and wherein edges between nodes in the sound-network UI are associated with distances between associated feature vectors in the feature-vector space; and
   in response to a UI command received from the user, warping the feature-vector space to optimize the relative importance of a sound feature in separating dissimilar nodes and in bringing similar nodes together.

17. The non-transitory computer-readable storage medium of claim 16, wherein the method further comprises performing a sound-recognition operation that recognizes one or more sounds in an audio stream based on combinations of sound primitives detected in the audio stream.

18. The non-transitory computer-readable storage medium of claim 17, wherein performing the sound-recognition operation comprises:
   recognizing a sequence of sound primitives in the audio stream;
   feeding the sequence of sound primitives into an infinite-state automaton that recognizes events associated with sequences of sound primitives; and
   feeding the recognized events into an output system that generates an output associated with the recognized events to be displayed to a user.

19. The non-transitory computer-readable storage medium of claim 16, wherein associating a semantic label with a sound primitive comprises the following:
   if semantic labels already exist for feature vectors in a feature-vector cluster for the sound primitive, examining the semantic labels to determine a dominant semantic label for the feature-vector cluster;
if semantic labels do not exist for the feature vectors in the feature-vector cluster, querying one or more users to obtain semantic labels for windows of consecutive sound samples associated with feature vectors in the feature-vector cluster to determine the dominant semantic label for the feature-vector cluster; and
associating the dominant semantic label with the sound primitive.

20. The non-transitory computer-readable storage medium of claim 16, wherein the method further comprises:
enabling the user to tag each node with a semantic label through the sound-network UI, thereby associating a corresponding window of consecutive sound samples with the semantic label; and
enabling the user to move nodes closer together or farther apart in the sound-network UI, which causes the feature-vector space to warp so that associated feature vectors are correspondingly closer together or farther apart in the feature-vector space.

21. The non-transitory computer-readable storage medium of claim 20, wherein when a node is moved in the sound-network UI, edges connecting the node with other nodes in the sound-network UI expand or contract, which changes corresponding attractive or repulsive forces exerted by the edges, thereby causing a set of directly or indirectly connected nodes in the sound-network UI to move accordingly.

22. The non-transitory computer-readable storage medium of claim 20, wherein each edge in the sound network has a default length, wherein compressing or stretching the edge away from the default length creates an opposing force that seeks to restore the edge to the default length.

23. The non-transitory computer-readable storage medium of claim 20, wherein displaying the sound network comprises:
displaying a set of nodes associated with a selected subset of the set of feature vectors; and
displaying a selected subset of edges between the set of nodes.

24. The non-transitory computer-readable storage medium of claim 20, wherein the sound-network UI enables a user to define supplemental edges between nodes displayed in the sound-network UI.

25. The non-transitory computer-readable storage medium of claim 20, wherein each semantic label is associated with a self-similarity value, which indicates a level of self-similarity among nodes that share the semantic label, wherein nodes that share a semantic label with a higher self-similarity value tend to be closer together in the sound-network UI than nodes that share a semantic label with a lower level of self-similarity value.

26. The non-transitory computer-readable storage medium of claim 20, wherein the method further comprises:
displaying a semantic network to the user through a semantic-network UI, wherein each node in the semantic-network UI represents a feature-vector cluster in the feature-vector space, and is tagged with a semantic label for the feature-vector cluster; and
enabling the user to move nodes closer together or farther apart in the semantic-network UI, which causes the feature-vector space to warp so that the associated feature-vector-cluster centers are correspondingly closer together or farther apart in the feature-vector space.

27. The non-transitory computer-readable storage medium of claim 26, wherein the semantic-network UI enables a user to:
create one or more event nodes, wherein each event node is associated with one or more lower-level semantic nodes or event nodes; and
create one or more action nodes, wherein each action node is associated with an event node and specifies an action to take in response to detecting an event associated with the event node.

28. A system that generates a set of sound primitives through an unsupervised learning process, the system comprising:
at least one processor and at least one associated memory;
a sound-primitive-generation mechanism that executes on the at least one processor, wherein during operation, the sound-primitive-generation mechanism:
performs a feature-detection operation on sound samples to detect a set of sound features, wherein each sound feature comprises a measurable characteristic of a window of consecutive sound samples, and wherein detecting the sound feature involves generating a coefficient indicating a likelihood that the sound feature is present in the window;
creates a set of feature vectors from coefficients generated by the feature-detection operation, wherein each feature vector is associated with a window of consecutive sound samples and comprises a set of coefficients for sound features detected in the window;
performs a clustering operation on the set of feature vectors to produce a set of feature-vector clusters, wherein each feature-vector cluster comprises a set of feature vectors that are proximate to each other in a feature-vector space that contains the set of feature vectors;
defines a set of sound primitives, wherein each sound primitive is associated with a feature-vector cluster in the set of feature-vector clusters; and
associates semantic labels with sound primitives in the set of sound primitives, wherein a semantic label for a sound primitive comprises one or more words that describe a sound characterized by the sound primitive; and
a sound-network UI that displays a sound network to a user, wherein the sound-network UI represents the feature-vector space that contains the set of feature vectors, wherein nodes in the sound-network UI represent feature vectors in the feature-vector space, wherein edges between nodes in the sound-network UI are associated with distances between associated feature vectors in the feature-vector space, and wherein the sound-network UI command facilitates warping the feature-vector space to optimize the relative importance of a sound feature in separating dissimilar nodes and in bringing similar nodes together.

29. The system of claim 28, further comprising a sound-recognition mechanism that performs a sound-recognition operation that recognizes one or more sounds in an audio stream based on combinations of sound primitives detected in the audio stream.

30. The system of claim 28, further comprising:
wherein the sound-network UI enables the user to tag each node with a semantic label, thereby associating a corresponding window of consecutive sound samples with the semantic label; and wherein the sound-network UI enables the user to move nodes closer together or farther apart in the sound-network UI, which causes the feature-vector space to warp so that associated feature vectors are correspondingly closer together or farther apart in the feature-vector space.

31. The system of claim 30, further comprising a semantic-network UI that displays a semantic network to the user, wherein each node in the semantic-network UI represents a feature-vector cluster in the feature-vector space, and is tagged with a semantic label for the feature-vector cluster, and wherein the semantic-network UI enables the user to move nodes closer together or farther apart in the semantic-network UI, which causes the feature-vector space to warp so that the associated feature-vector-cluster centers are correspondingly closer together or farther apart in the feature-vector space.

* * * * *